Sept. 29, 1931.                G. F. FRINE                1,824,814
                          FRUIT WASHING MACHINE
                  Filed Sept. 10, 1928         4 Sheets-Sheet 1
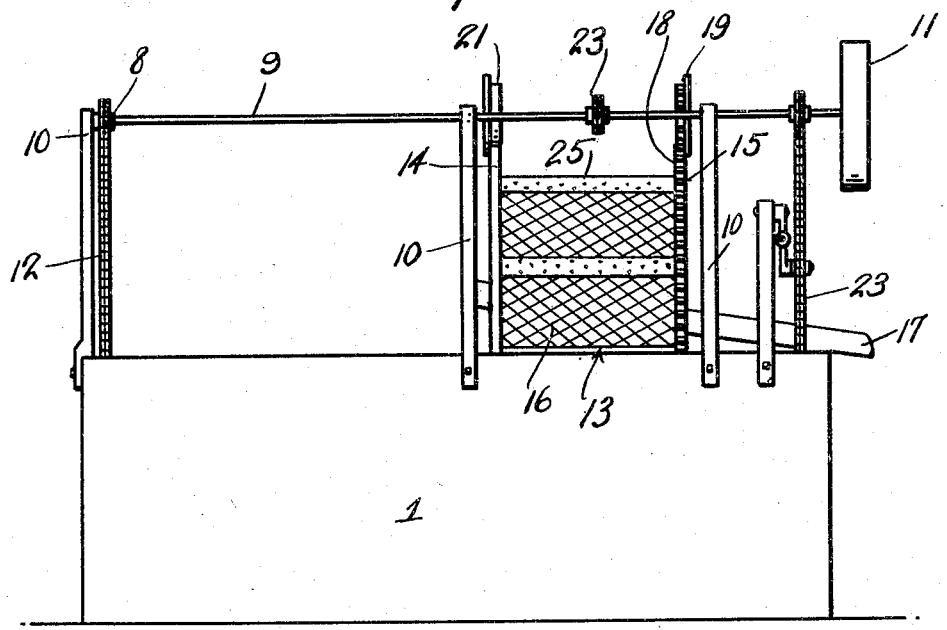
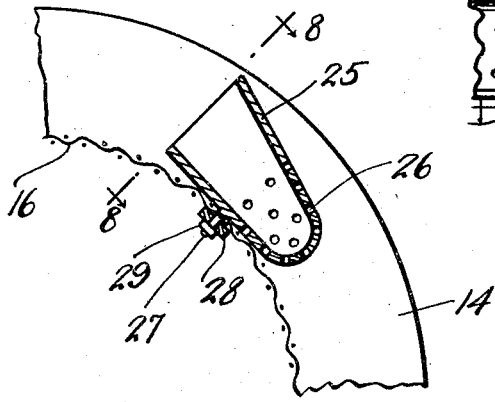
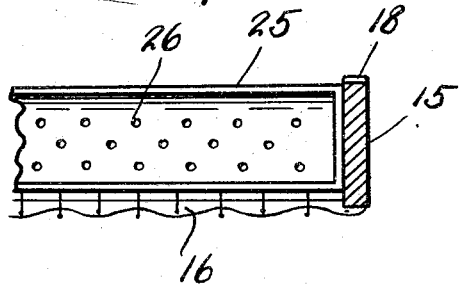
Inventor
G. F. Frine
By *Clarence A. O'Brien*
               *Attorney*

Sept. 29, 1931.          G. F. FRINE          1,824,814
                    FRUIT WASHING MACHINE
            Filed Sept. 10, 1928      4 Sheets-Sheet 2
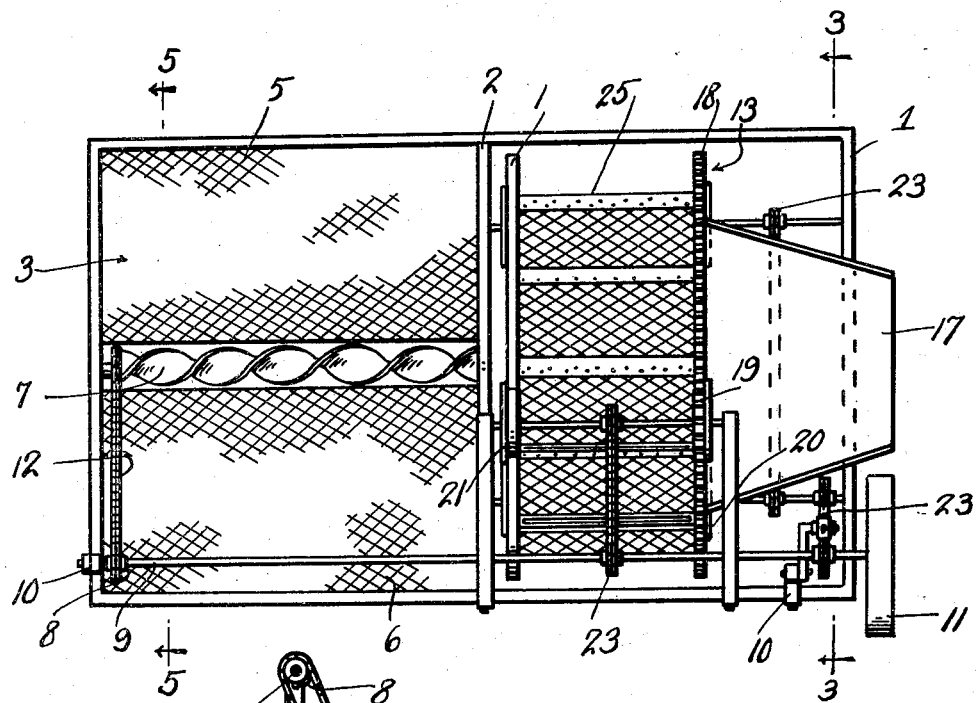
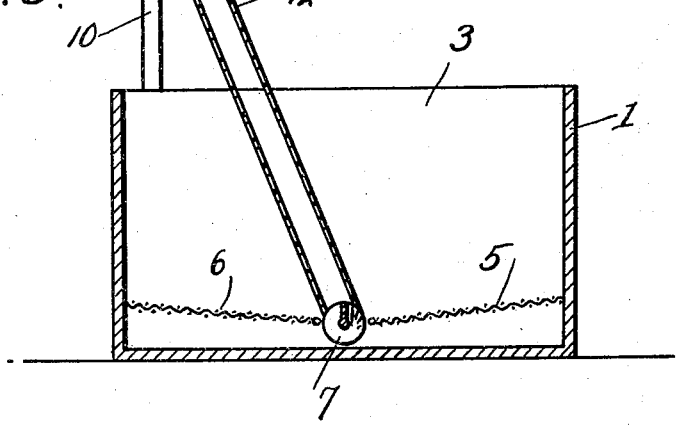
Inventor
G. F. Frine
By *Clarence A. O'Brien*
Attorney Sept. 29, 1931.   G. F. FRINE   1,824,814
FRUIT WASHING MACHINE
Filed Sept. 10, 1928   4 Sheets-Sheet 3

Inventor
G. F. Frine
By Clarence A. O'Brien
Attorney

Sept. 29, 1931.  G. F. FRINE  1,824,814

FRUIT WASHING MACHINE

Filed Sept. 10, 1928  4 Sheets-Sheet 4

Inventor

G. F. Frine

By Clarence A. O'Brien
Attorney

Patented Sept. 29, 1931

1,824,814

UNITED STATES PATENT OFFICE

GEORGE F. FRINE, OF SODUS, NEW YORK

FRUIT WASHING MACHINE

Application filed September 10, 1928. Serial No. 304,929.

The present invention relates to improvements in fruit treating apparatus and has reference more particularly to a machine for washing the fruit in an efficient and expeditious manner.

One of the important objects of the present invention is to provide a fruit washing machine which includes a tank in which the fruit to be washed is initially placed, a rotatable drum being arranged for movement within the tank and having associated therewith a screened peripheral portion, on which is arranged in a transverse manner a series of annular spaced perforated buckets whereby the fruit is elevated from the tank, the water being drained from the fruit during the elevation of the same upwardly out of the tank, a discharge chute being arranged for association with the rotatable drum to convey the washed fruit into a suitable container or receptacle.

A further object is to provide a fruit washing machine which is simple in construction, inexpensive, strong and durable, and further well adapted to the purpose for which it is designed.

Other objects of the invention will become apparent as the nature of the invention proceeds and when taken in connection with the accompanying drawings.

In the accompanying drawings, forming a part of this application and wherein like reference characters designate like parts throughout the views:

Figure 1 is a side elevation of the fruit washing machine embodying my invention.

Figure 2 is a top plan view thereof.

Figure 5 is a sectional view, taken approximately on the line 5—5 of Figure 2, looking in the direction of the arrows.

Figure 7 is a fragmentary detail, showing the manner in which each of the perforated buckets is secured to the screened drum.

Figure 8 is a sectional view, taken approximately on the line 8—8 of Figure 7, looking in the direction of the arrows.

Figure 4:
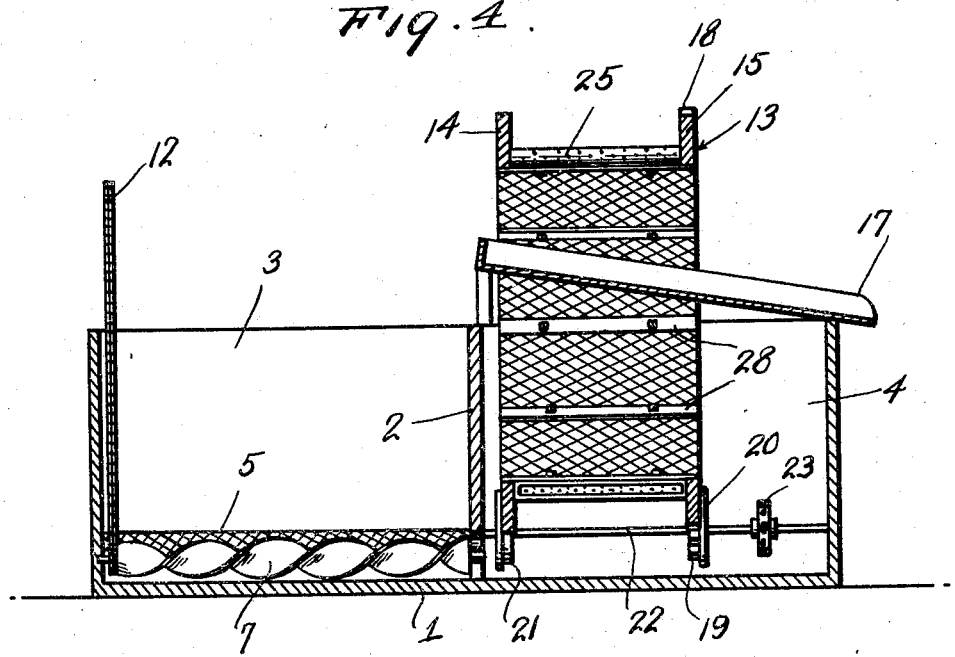
Figure 4 is a longitudinal sectional view taken through the machine.
Figure 6:
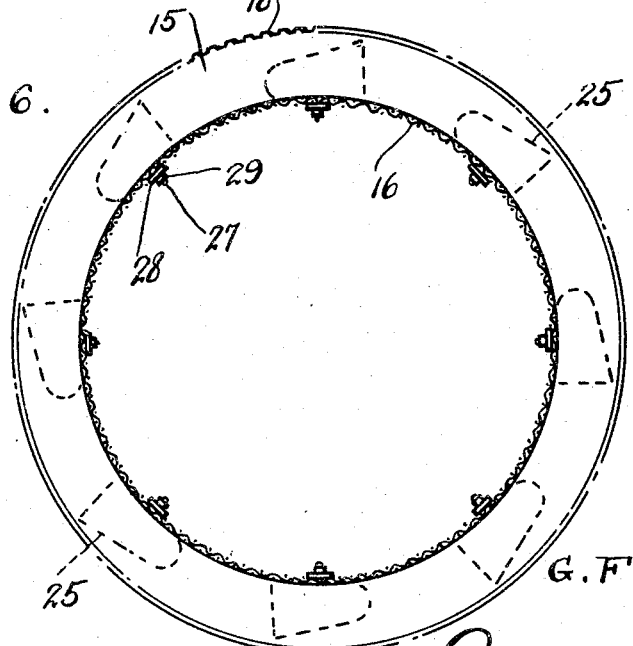
Figure 6 is a detail of the drum.

In the drawings, wherein for the purpose of illustration is shown the preferred embodiment of my invention, the numeral 1 designates a substantially rectangular shaped open top tank, a vertical partition 2 being arranged transversely in the intermediate portion of the tank to divide the same into the compartments 3 and 4 respectively, as is clearly illustrated in Figures 2 and 4 of the drawings. This tank has both of its compartments filled with water to a suitable level and as is clearly shown in Figures 2, 4, and 5 of the drawings, the compartment 3 is provided with a false bottom that consists of the screen sections 5 and 6 respectively, the same sloping downwardly toward the center of the compartment, and the inner opposed longitudinal edges of these sections are spaced with respect to each other to accommodate the screw conveyor 7, that extends longitudinally of the compartment 3.

The ends of the screw conveyor are journaled in suitable bearings provided therefor in the respective ends of the compartment 3, and a sprocket wheel is arranged on the rear end of the screw conveyor 7, in alignment with a similar sprocket wheel 8, that is arranged on the rear end portion of a longitudinally extending shaft 9, which shaft is supported by suitable standards 10, that extend upwardly from the tank 1. A drive pulley 11 is mounted on the forward end of the shaft 9 for connection with any suitable source of power. A sprocket chain 12 is trained over the sprocket wheels associated with the rear ends of the screw conveyor 7 and the shaft 9, to provide an operative connection between the shaft 9 and the screw conveyor.

Arranged for rotation within the compartment 4 is the drum designated generally by the reference character 13. This drum includes a pair of parallel spaced rings or annular members 14 and 15 respectively. A relatively wide band of wire mesh material 100 connects the spaced rings or annular members together at their inner peripheral edges, and this wire mesh portion of the drum is denoted by the reference character 16. The wire mesh band is of such construction as to permit the fruit undergoing the washing treatment to pass through the band for discharge onto the chute 17 around which the drum rotates.

The ring or annular member 15 is formed in its outer peripheral edge with the gear teeth 18 for meshing engagement with the pinion 19, carried by suitable counter shafts. A flange 20 is formed on the outer side face of each pinion 19 for engagement with the outer side face of the ring 15. The outer peripheral edge of the complementary ring or annular member 14 engages with the flanged rollers 21, also mounted on suitable counter shafts 22, and these rollers and pinions constitute a supporting means for the rotatable drum 13.

The counter shafts are operatively connected with the main drive shaft 9, through suitable sprocket chains and sprocket wheels shown generally at 23.

Figure 3:
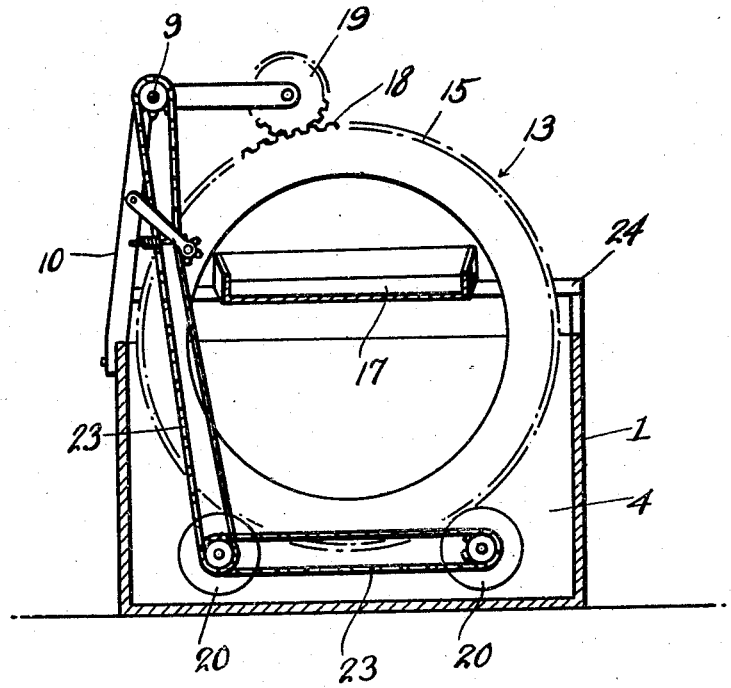
Figure 3 is a vertical sectional view, taken approximately on the line 3—3 of Figure 2.

In Figures 2 and 3, there is more clearly illustrated the arrangement of the supporting and driving means for a rotatable drum, and it will be observed that new counter shafts are arranged in the compartment 4 below the drum 13, and these shafts are connected together by a sprocket chain, and one of the counter shafts (just described) is in turn operatively connected with the drive shaft 9. A third counter-shaft is disposed above the drum 13 and supports thereon a pinion and a flanged roller for cooperative relation with the toothed and plain ring members of the drum and this uppermost counter-shaft is also connected with the drive shaft 9.

The discharge chute 17 has its sides gradually converging toward the forward end and upstanding flanges are provided at the sides and rear ends of the chute, and furthermore this chute is inclined downwardly toward the forward end of the machine.

Any suitable supporting means may be provided for the rear end of the chute 17 as shown at 24.

Figure 9:
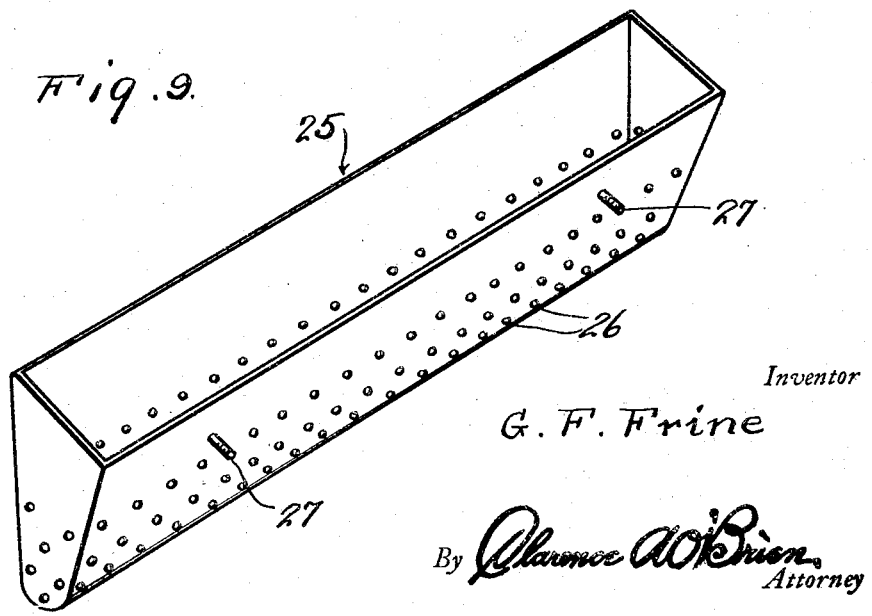
Figure 9 is a detail perspective view of one of the perforated buckets.

Forming a salient part of the present invention are the perforated buckets denoted generally by the reference character 25, and one of these buckets is shown in detail in Figure 9. Each bucket is of substantially V-shaped formation in cross section and the sides and ends thereof are formed with the perforations 26 and threaded studs 27 project from one side.

The buckets are disposed transversely across the outer surface of the sieve-like band 16 of the drum 13 for disposition between the rings or annular members 14 and 15, at spaced intervals with the open sides of the buckets facing in the same direction, and cross bars or slats 28 extend transversely from the inner face of the screen portion 16, one slat or cross bar being provided for each bucket, and each of these bars or slats is formed with suitable openings to accommodate the threaded studs 27 and to which nuts 29 are threaded on the threaded ends of the studs, to positively secure the buckets in position around the screen like band 16 of the drum 13, as clearly shown in Figure 7.

The operation of my improved fruit washing machine may be briefly stated as follows:

The fruit is initially placed in the compartment 3, and the same will be immersed in the water contained in the tank 1. From the compartment 3, the fruit is delivered into the compartment 4, by reason of the screw conveyor 7, and during the rotation of the drum 13, the buckets 25 will successively scoop up the water soaked fruit, and elevate or carry the same upwardly out of the compartment 4. During such movement of the drum 13, the water will drain from the fruit through the openings 26 in the buckets back into the compartment 4, and when the fruit reaches the top of the drum, the same will be discharged onto the chute 17 through the screened band 16, whence the washed fruit is delivered into a suitable receptacle placed underneath the discharge end of the inclined chute 17.

The heavier or foreign matter will settle in the bottom of the compartment 4.

It will thus be seen from the foregoing description that I have provided a fruit washing machine that will save considerable time and labor and furthermore will wash the fruit in a thorough and expeditious manner.

A machine of this character can be constructed at a very low cost, and the same will be strong and durable and at all times positive and efficient in its operation.

While I have shown the preferred embodiment of my invention, it is to be understood that various changes in the size, shape and arrangement of parts may be resorted to, without departing from the spirit of the invention or the scope of the appended claim.

Having thus described my invention, what I claim as new is:

In a fruit washing machine, an open top tank adapted to be filled with liquid, a partition arranged within the tank for dividing the same into a rear fruit receiving compartment, and a forward delivery compartment, an endless conveyor located within the first mentioned compartment, fruit receiving screens located within said first mentioned compartment and sloping from opposite side walls of the compartment to terminate in spaced relation on opposite longitudinal sides of said conveyor, a rotatable drum located within said forward delivery compartment, said drum including an annular band of foraminous material, a series of perforated buckets arranged in the annular face of the foraminous band, securing means for the bucket, an inclined discharge chute having its rear end arranged axially within the upper portion of the drum, means for rotatably supporting said drum in said forward compartment, means for actuating said endless conveyor, and an operating connection between the first mentioned and last mentioned means, whereby said drum and said conveyor may be actuated simultaneously.

In testimony whereof I affix my signature.

GEORGE F. FRINE.